(12) United States Patent
Hultell et al.

(10) Patent No.: US 9,008,201 B2
(45) Date of Patent: Apr. 14, 2015

(54) ROBUST HARQ-ACK DESIGN FOR MF-HSDPA

(71) Applicant: Telefonaktiebolaget L M Ericsson (publ), Stockholm (SE)

(72) Inventors: Johan Hultell, Solna (SE); Peter von Wrycza, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 70 days.

(21) Appl. No.: 13/702,602

(22) PCT Filed: Nov. 9, 2012

(86) PCT No.: PCT/SE2012/051227
§ 371 (c)(1),
(2) Date: Dec. 7, 2012

(87) PCT Pub. No.: WO2013/070168
PCT Pub. Date: May 16, 2013

(65) Prior Publication Data
US 2014/0064415 A1 Mar. 6, 2014

Related U.S. Application Data

(60) Provisional application No. 61/557,803, filed on Nov. 9, 2011.

(51) Int. Cl.
H04K 1/10 (2006.01)
H04L 27/28 (2006.01)
(Continued)

(52) U.S. Cl.
CPC ............ *H04L 1/1864* (2013.01); *H04L 1/0043* (2013.01); *H04L 1/0073* (2013.01); *H04L 1/1621* (2013.01); *H04L 2001/125* (2013.01); *H04L 27/2647* (2013.01)

(58) Field of Classification Search
USPC ......... 375/260, 261, 264, 296, 298, 284, 285, 375/346, 341; 370/336, 206, 207, 329
See application file for complete search history.

(56) References Cited

U.S. PATENT DOCUMENTS 8,514,820 B2 * 8/2013 Cai et al. ........................ 370/336
8,638,768 B2 * 1/2014 Fan et al. ....................... 370/338

FOREIGN PATENT DOCUMENTS

WO 2008041098 A2 4/2008

OTHER PUBLICATIONS

3rd Generation Partnership Project. HSDPA Multiflow Data Transmission—Feature. 3GPP TSG RAN Meeting #53, RP-111375, Fukuoka, Japan, Sep. 13-16, 2011, pp. 1-5.

(Continued)

Primary Examiner — Phuong Phu
(74) Attorney, Agent, or Firm — Coats & Bennett, PLLC

(57) ABSTRACT

When a UE (12) is configured with MF-HSDPA and HARQ-ACK information associated with cells (14, 16) (characterized by potentially different downlink timing) is jointly encoded, only part of the existing Rel-9 HARQ-ACK codebook is reused. In one embodiment, only the codebook conflict arising from reuse of encodings is resolved. This is achieved by introducing a new codeword for at least one of the HARQ-ACK code words that are used multiple times in the existing Rel-9 codebook. In another embodiment, all codewords in the Rel-9 HARQ-ACK codebook having a Hamming distance smaller than a predetermined value (but not all codewords) are replaced. In yet another embodiment, all codewords in the Rel-9 HARQ-ACK codebook having a Hamming distance smaller than a predetermined value (but not all codewords) that would cause ambiguity at the NodeB receiver (i.e. where the interpretation of the HARQ-ACK information for one cell (14) depends on the number of streams transmitted at the other cell (16)) are replaced.

15 Claims, 4 Drawing Sheets

(51) Int. Cl.
*H04L 1/18* (2006.01)
*H04L 1/00* (2006.01)
*H04L 1/16* (2006.01)
*H04L 27/26* (2006.01)
*H04L 1/12* (2006.01)

(56) References Cited

OTHER PUBLICATIONS

3rd Generation Partnership Project. HSDPA Multiflow Data Transmission—Performance. 3GPP TSG RAN Meeting #53, RP-111375, Fukuoka, Japan, Sep. 13-16, 2011, pp. 1-5.

3rd Generation Partnership Project. HSDPA Multiflow Data Transmission—Core. 3GPP TSG RAN Meeting #53, RP-111375, Fukuoka, Japan, Sep. 13-16, 2011, pp. 1-6.

3rd Generation Partnership Project. Technical Specification Group Radio Access Network; High Speed Packet Access (HSDPA multipoint transmission (Reslease 11). 3GPP TR 25.872 V11.0.0, Sep. 2011, pp. 1-29, Sophia Antipolis, Valbonne, France.

Ericsson et al., "Multi-point transmission techniques for HSPA," 3GPP TSG RAN WG1 Meeting #62bis, Nov. 15-19, 2010, R1-106251, Jacksonville, FL.

Ericsson, "DC-HSDPA MIMO ACKNACK codebook," 3GPP TSG RAN WG1 Meeting #57, May 4-8, 2009, R1-091901, San Francisco, US.

Interdigital Communications, LLC, "HS-DPCCH design consideration for HSDPA MF-TX," 3GPP TSG-RAN WG1 Meeting #67, Nov. 14-18, 2011, R1-114174, San Francisco, US.

3rd Generation Partnership Project, "Multiplexing and channel coding (FDD)", Technical Specification Group Radio Access Network, 3GPP TS 25.212 V10.0.0, (Sep. 2010), (Release 10).

* cited by examiner

| HARQ ACK MESSAGE TO BE TRANSMITTED | w0 | w1 | w2 | w3 | w4 | w5 | w6 | w7 | w8 | w9 | HARQ ACK MESSAGE TO BE TRANSMITTED | w0 | w1 | w2 | w3 | w4 | w5 | w6 | w7 | w8 | w9 |
|---|---|---|---|---|---|---|---|---|---|---|---|---|---|---|---|---|---|---|---|---|---|
| A/D | 1 | 1 | 1 | 1 | 1 | 1 | 1 | 1 | 1 | 1 | AA/A | 0 | 1 | 1 | 0 | 0 | 0 | 0 | 1 | 0 | 0 |
| N/D | 0 | 0 | 0 | 0 | 0 | 0 | 0 | 0 | 0 | 0 | AA/N | 1 | 1 | 1 | 0 | 0 | 1 | 1 | 0 | 1 | 0 |
| AA/D | 1 | 0 | 1 | 0 | 1 | 1 | 1 | 1 | 0 | 1 | AN/A | 1 | 0 | 1 | 1 | 1 | 0 | 0 | 1 | 1 | 0 |
| AN/D | 1 | 1 | 0 | 1 | 0 | 1 | 0 | 1 | 1 | 1 | AN/N | 0 | 0 | 1 | 1 | 0 | 1 | 0 | 0 | 0 | 1 |
| NA/D | 0 | 1 | 1 | 1 | 1 | 0 | 1 | 0 | 1 | 1 | NA/A | 0 | 1 | 0 | 1 | 1 | 1 | 1 | 1 | 0 | 0 |
| NN/D | 1 | 0 | 0 | 1 | 0 | 0 | 1 | 0 | 0 | 0 | NA/N | 1 | 1 | 0 | 0 | 1 | 0 | 0 | 0 | 0 | 1 |
| D/A | 0 | 0 | 0 | 0 | 0 | 1 | 1 | 1 | 1 | 1 | NN/A | 0 | 0 | 0 | 0 | 1 | 1 | 0 | 0 | 1 | 0 |
| D/N | 1 | 1 | 1 | 1 | 1 | 1 | 0 | 0 | 0 | 0 | NN/N | 0 | 1 | 0 | 0 | 0 | 1 | 1 | 0 | 0 | 1 |
| D/AA | 1 | 0 | 0 | 0 | 1 | 0 | 0 | 0 | 1 | 1 | AA/AA | 0 | 1 | 1 | 0 | 1 | 1 | 0 | 1 | 1 | 1 |
| D/AN | 0 | 1 | 0 | 0 | 0 | 0 | 1 | 1 | 0 | 1 | AA/AN | 1 | 0 | 1 | 1 | 0 | 0 | 1 | 1 | 1 | 1 |
| D/NA | 0 | 0 | 0 | 1 | 1 | 1 | 1 | 1 | 1 | 0 | AA/NA | 1 | 1 | 0 | 1 | 1 | 1 | 1 | 0 | 0 | 1 |
| D/NN | 1 | 1 | 1 | 1 | 1 | 0 | 0 | 1 | 0 | 0 | AA/NN | 0 | 1 | 1 | 1 | 0 | 1 | 1 | 1 | 0 | 0 |
| A/A | 1 | 1 | 0 | 1 | 0 | 0 | 0 | 0 | 1 | 1 | AN/AA | 0 | 0 | 0 | 1 | 1 | 0 | 0 | 1 | 0 | 1 |
| A/N | 0 | 0 | 1 | 1 | 1 | 0 | 1 | 0 | 0 | 1 | AN/AN | 1 | 1 | 1 | 0 | 0 | 0 | 0 | 0 | 0 | 1 |
| N/A | 1 | 0 | 0 | 1 | 0 | 1 | 1 | 1 | 0 | 0 | AN/NA | 1 | 0 | 0 | 0 | 0 | 1 | 0 | 1 | 0 | 0 |
| N/N | 0 | 1 | 1 | 0 | 0 | 1 | 0 | 1 | 0 | 1 | AN/NN | 0 | 0 | 1 | 1 | 0 | 1 | 0 | 0 | 0 | 1 |
| A/AA | 1 | 0 | 1 | 0 | 0 | 1 | 1 | 0 | 0 | 0 | NA/AA | 1 | 1 | 0 | 0 | 1 | 0 | 1 | 1 | 1 | 0 |
| A/AN | 1 | 0 | 0 | 1 | 0 | 1 | 0 | 1 | 0 | 1 | NA/AN | 0 | 0 | 1 | 0 | 1 | 0 | 1 | 0 | 0 | 0 |
| A/NA | 0 | 0 | 1 | 1 | 1 | 0 | 1 | 0 | 0 | 1 | NA/NA | 1 | 0 | 1 | 1 | 1 | 1 | 0 | 0 | 1 | 0 |
| A/NN | 0 | 1 | 1 | 1 | 0 | 1 | 0 | 0 | 1 | 1 | NA/NN | 1 | 1 | 1 | 0 | 0 | 1 | 1 | 0 | 1 | 0 |
| N/AA | 1 | 1 | 0 | 1 | 0 | 0 | 1 | 0 | 1 | 0 | NN/AA | 0 | 1 | 0 | 1 | 0 | 0 | 0 | 0 | 1 | 0 |
| N/AN | 1 | 1 | 0 | 0 | 0 | 1 | 0 | 1 | 1 | 0 | NN/AN | 0 | 0 | 1 | 0 | 0 | 0 | 0 | 1 | 1 | 0 |
| N/NA | 0 | 1 | 1 | 0 | 1 | 0 | 1 | 0 | 1 | 0 | NN/NA | 0 | 1 | 0 | 0 | 1 | 1 | 0 | 0 | 0 | 0 |
| N/NN | 0 | 0 | 1 | 0 | 1 | 1 | 0 | 1 | 0 | 1 | NN/NN | 0 | 0 | 0 | 0 | 0 | 1 | 1 | 0 | 1 | 1 |
| PRE/POST | | | | | | | | | | | | | | | | | | | | | | |
| PRE | 0 | 0 | 1 | 0 | 0 | 1 | 0 | 0 | 1 | 0 | POST | 0 | 1 | 0 | 0 | 1 | 0 | 0 | 1 | 0 | 0 |

*FIG. 1*

ROBUST HARQ-ACK DESIGN FOR MF-HSDPA

The present invention relates generally to wireless communications, and in particular to HARQ-ACK encoding in MF-HSDPA operation.

BACKGROUND

Multi-Carrier (MC) High Speed Downlink Packet Access (HSDPA) transmission was standardized in 3GPP Rel-8/9/10/11. This allows a wireless User Equipment (UE) to simultaneously receive data transmissions from multiple cells. For MC-HSDPA, it is required that all cells, on which the downlink transmission occurs to a particular UE, belong to the same sector and have identical cell timing, i.e., are time-aligned. This allows the use of one High Speed Dedicated Physical Control Channel (HS-DPCCH) carrying the Hybrid Automatic Repeat reQuest ACKnowledgement (HARQ-ACK) and Pre-Coding Information/Channel Quality Information (PCI/CQI) feedback for all cells, without compromising the HARQ-ARQ time budget for the NodeB or UE.

At the RAN#53 plenary, a work item on multi-flow (MF) HSDPA was initiated, as detailed in RP-111375, "HSDPA Multiflow Data Transmissions," the disclosure of which is incorporated by reference herein in its entirety. MF-HSDPA transmissions allow a UE to receive data from different, potentially uncoordinated, cells. Further, during the RAN1#66bis meeting, an agreement was made that MF-HSDPA transmission should be supported in combination with 2×2 MIMO.

For MF-HSDPA, data is spread across two or more sectors. One HS-DPCCH design alternative is to let the UE pair the HS-PDSCH Transmission Time Intervals (TTI), resulting in maximum overlap, and jointly encode the HARQ-ACK information. Such a solution was discussed during the study item, as detailed in TR 25.872, "High Speed Packet Access (HSDPA) multipoint transmission, v 11.0.0," the disclosure of which is incorporated herein by reference in its entirety. However, this approach does not support inter-site scenarios, where Multiple Input, Multiple Output (MIMO) is configured on one or more of the cells. This is because the 3GPP Rel-9 Dual-Cell HSDPA with MIMO codebook assumes that the receiver knows the number of High Speed Downlink Shared CHannel (HS-DSCH) packets that were transmitted.

The Technical Standard 3GPP TS 25.212 specifies, in Table 15C.2 in subsection 4.7.3B.1, the channel coding for the composite HS-DPCCH HARQ-ACK, when the UE is configured for MIMO mode and a secondary cell is enabled. In this Table, presented in FIG. 1 for ease of reference, the feedback related to the serving HS-DSCH cell is given before the divider sign and the feedback related to the secondary serving HS-DSCH cell is given after the divider sign. 'A' means 'ACK', 'N' means 'NACK' and 'D' means 'no transmission' ('DTX'). 'AA', 'AN', 'NA' and 'NN' refer to feedback for dual-stream transmission in a cell. For example, 'AN' means ACK on the primary stream and NACK on the secondary stream. The coding of Table 15C.2 is also referred to herein as the "Rel-9 codebook."

The coding of Table 15C.2 assumes that the receiver knows the number of HS-DSCH packets that were transmitted. For example, by inspection of Table 15C.2, one can see that the same codeword is used for ANN and NA/NN. Without knowledge of the number of transmitted blocks on the secondary serving cell, there is an uncertainty in the decoding of the primary serving cell.

Another drawback of a solution based on joint HARQ-ACK encoding is the decrease in the HARQ time budget at the UE and/or NodeB. If cells with different cell timings are jointly encoded, this reduction can be up to 1.5 slots. This reduction has to be taken by NodeB and/or UE. Also, new events might need to be introduced to account for potential timing drifts of the clocks at the two sectors. This may, for example, require non-trivial intervention by the RNC, which is not desirable. Furthermore, these type of events will increase the RNC load.

SUMMARY

According to embodiments of the present invention, when a UE is configured with MF-HSDPA and HARQ-ACK information associated with cells (characterized by potentially different downlink timing) is jointly encoded, only part of the existing Rel-9 HARQ-ACK codebook is reused. In one embodiment, only the codebook conflict arising from reuse of encodings, as discussed above, is resolved. This is achieved by introducing a new codeword for at least one of the HARQ-ACK code words that are used multiple times in the existing Rel-9 codebook. In another embodiment, all codewords in the Rel-9 HARQ-ACK codebook having a Hamming distance smaller than a predetermined value (but not all codewords) are replaced. In yet another embodiment, all codewords in the Rel-9 HARQ-ACK codebook having a Hamming distance smaller than a predetermined value (but not all codewords) that would cause ambiguity at the NodeB receiver (i.e. where the interpretation of the HARQ-ACK information for one cell depends on the number of streams transmitted at the other cell) are replaced.

BRIEF DESCRIPTION OF THE DRAWINGS

FIG. 1 depicts the codebook of Table 15C.2 of 3GPP TS 25.212.

DETAILED DESCRIPTION

Figure 2:
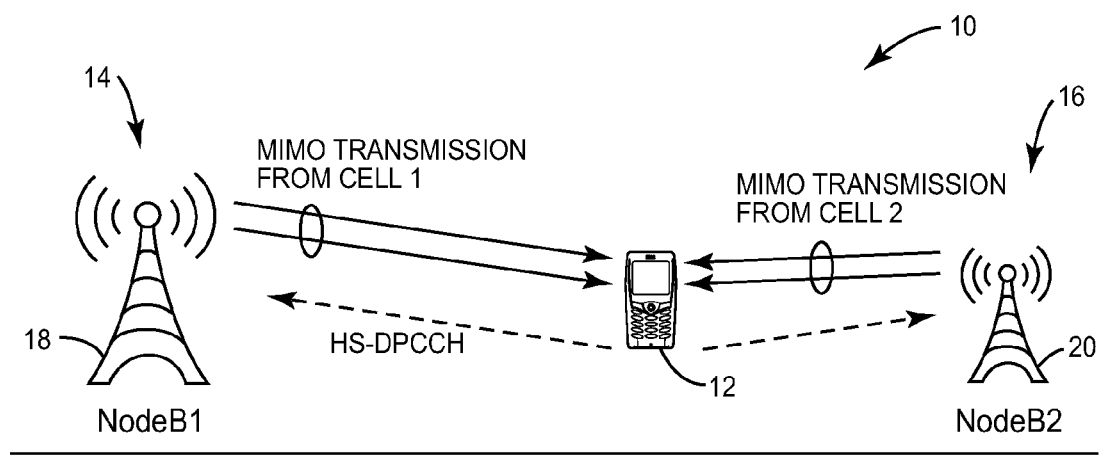
FIG. 2 is a functional block diagram depicting a UE in MF-HSDPA employing MIMO in both cells.

FIG. 2 illustrates a wireless network 10 wherein a UE 12 is configured with MF-HSDPA and MIMO in each of two cells 14, 16. In this case the UE 12 may receive two transport blocks from each cell 14, 16 in a given TTI. The HARQ-ACK information is jointly encoded and one codeword is transmitted on the HS-DPCCH. Note that only one HS-DPCCH is transmitted and has to be received by both NodeBs 18, 20. Since one cell 14 has no knowledge of the data transmitted by the other cell 16, use of the 3GPP Rel-9 codebook (i.e., Table 15C.2 of TS 25.212, depicted in FIG. 1) may introduce ambiguity.

In particular, three codewords are re-used in the Rel-9 codebook. These correspond to:
A/N and A/NA
AA/N and NA/NN, and
AN/N and AN/NN Of these three, the codeword for ANN and NA/NN {1 1 1 0 0 1 1 0 1 0} results in an ambiguity, as the decoding of the primary serving cell 14 becomes dependent on the number of streams employed by the secondary serving cell 16. In multiflow configurations, no such exchange of information is assumed between the different sectors and hence it might not be possible to know the number of transmitted blocks scheduled by the other cell 16 with which the HARQ-ACK information is jointly encoded.

One solution to this conflict is to assign different codewords for the AA/N and NA/NN cases, and thereby resolve the ambiguity. For example, in one embodiment, the codeword {1 0 1 0 1 0 1 0 1 0} is used either for the AA/N or NA/NN case, since this codeword currently is unused in the table. In another embodiment, where it is known that certain multi-flow configurations will not be configured, a subset of codewords corresponding to the unused configurations are used, thus avoiding an overlap.

According to another embodiment of the present invention, a subset of the HARQ-ACK code words in the Rel-9 codebook are replaced by new code words. The codewords selected for replacement satisfy two properties:

They could result in ambiguity for the NodeB 18, 20 (i.e. where the interpretation of the ACK/NACK information carried in HARQ-ACK codeword for one particular cell 14 is dependent on the number of streams that are transmitted on the other cell 16), and The Hamming distance between the codewords is smaller than a predetermined value (A reduced Hamming distance is an indication that errors between codewords are increasingly likely)

As one non-limiting example, Table 15C.2 (see FIG. 1) specifies the following HARQ-ACK codewords:

N/AA{1 1 0 1 0 0 1 0 1 0}and
A/A {1 1 0 1 0 0 0 0 1 1}

For these codewords and for the (primary) cell 14, the interpretation depends on whether one or two transport blocks have been scheduled on the other cell 16. Furthermore, the Hamming distance between these code words is two (that is, they differ in only two bit positions). Accordingly, they are candidates, according to embodiments disclosed herein, for at least one being replaced with another codeword.

Figure 3:
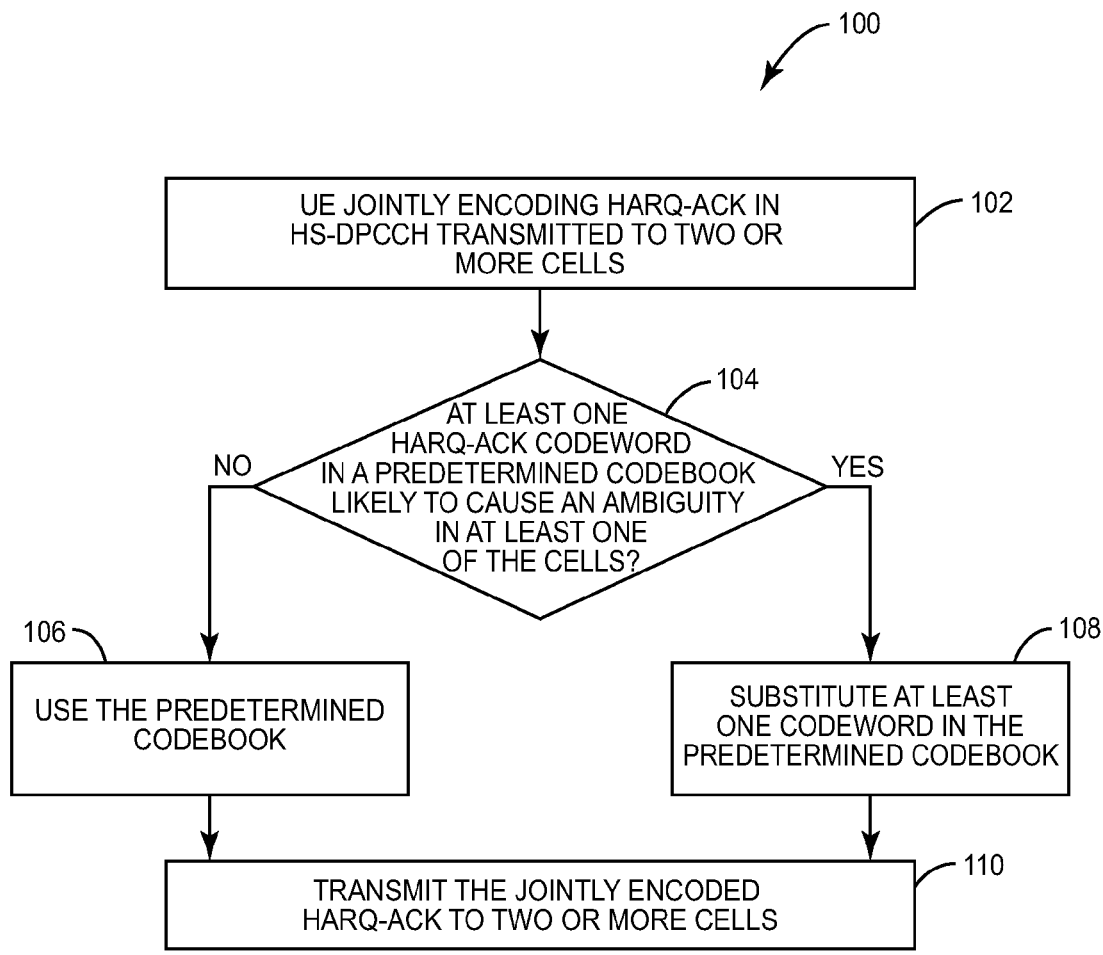
FIG. 3 is a flow diagram depicting the decision tree(s) in a method of robust HARQ-ACK encoding according to embodiments of the present invention.

FIG. 3 depicts a method 100 of robust HARQ-ACK encoding and transmission according to embodiments of the present invention. The UE 12 is jointly encoding HARQ-ACK in a HS-DPCCH transmission to two or more non-time-aligned cells 14, 16 (block 102). If the UE 12 determines that at least one HARQ-ACK codeword in a predetermined codebook (i.e., the Rel-9 codebook) is likely to cause an ambiguity in at least one of the cells 14, 16 (block 104), the UE 12 substitutes at least one codeword for a codeword in the predetermined codebook (block 108). As explained herein, the ambiguity may arise from reuse of codewords in the predetermined codebook, the similarity (in Hamming distance) of two or more codewords in the predetermined codebook, and/or ambiguity arising due to one cell 14 having no knowledge of the transmission patterns of the other cell 16 (where the predetermined codebook presumes such knowledge). If the applicable codewords would not cause such ambiguity, the UE 12 may use the predetermined codebook (block 108). In either case, the UE 12 then transmits the jointly encoded HARQ-ACK to the two or more cells 14, 16 (block 110).

Figure 4:
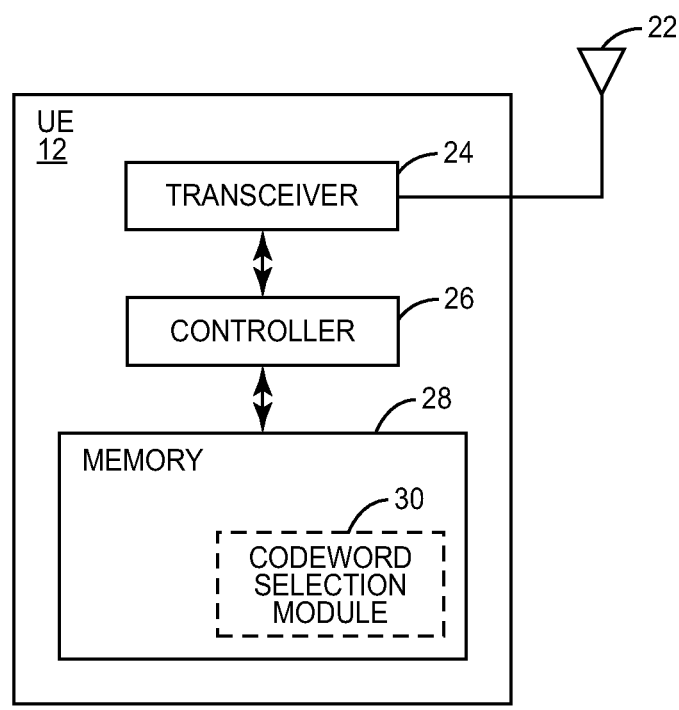
FIG. 4 is a functional block diagram depicting a UE according to embodiments of the present invention.

FIG. 4 depicts a UE 12 operative in embodiments of the present invention. The UE 12 includes one or more antennas 22 connected to a transceiver 24. The transceiver 24 is operative to simultaneously receive one or more transport blocks from each of one or more cells 14, 16. The transceiver 24 is controlled by a controller 26, which may for example comprise a state machine, programmable logic together with appropriate firmware, a programmable processor such as Digital Signal Processor (DSP) together with appropriate software, or some combination thereof. The controller 26 is operatively connected to memory 28, which may comprise hardare registers; volatile solid state memory such as RAM, DRAM, DDR DRAM, or the like; non-volatile solid state memory such as Flash, ROM, PROM, or the like; magnetic or optical media, such as hard disk drive, CD, DVD, or the like; or some combination thereof. The memory 30 includes a software module operative to implement a HARQ-ACK codeword according to embodiments of the present invention described herein.

Embodiments of the present invention resolve the codeword conflict in the codewords specified in Table 15C.2 in 3GPP TS 25.212, when one of the cells 14, 16 in a MF-HSDPA system is configured with MIMO. Furthermore, by also increasing the Hamming distance between similar codewords, HARQ-ACK decoding performance is improved, which improves the downlink throughput.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of robust HARQ-ACK reporting by a UE, comprising:
   receiving downlink transmissions from two or more cells, wherein each downlink transmission includes one or more streams;
   jointly encoding a HARQ-ACK response for the two or more cells by encoding a HARQ-ACK codeword to resolve an ambiguity in a predetermined codebook of HARQ-ACK codewords that includes at least one HARQ-ACK codeword for downlink MIMO transmissions from one or more of the cells, and such that the decoding of the jointly encoded HARQ-ACK codeword at each cell is independent of the number of streams in downlink transmissions from other cells; and
   transmitting the jointly encoded HARQ-ACK response to the two or more cells in a single uplink channel.

2. The method of claim 1 wherein the predetermined codebook is specified in Table 15C.2 of 3GPP TS 25.212.

3. The method of claim 1 wherein the single channel on which jointly encoded HARQ-ACK is transmitted to two or more cells is HS-DPCCH.

4. The method of claim 1 wherein the ambiguity arises due to reuse, in the predetermined codebook, of the same codeword to represent two or more different HARQ-ACK joint encodings.

5. The method of claim 1 wherein at least one of the cells operates in Multiple Input, Multiple Output (MIMO) mode.

6. The method of claim 5 wherein the ambiguity arises due to one cell having insufficient knowledge of the transmissions of the other cell to distinguish between HARQ-ACK joint encodings in the predetermined codebook.

7. The method of claim 1 wherein the ambiguity arises due to similarity between two or more codewords in the predetermined codebook, and further comprising:
   calculating the Hamming distance between the similar codewords creating the ambiguity; and
   wherein substituting substituting for the identified codeword, a different HARQ-ACK codeword comprises substituting the codeword only if the Hamming distance is less than a predetermined value.

8. A UE operative to receive downlink MIMO transmissions from two or more cells of a wireless communication network wherein the cells are not in the same sector and not time-aligned, comprising:
- a transceiver operative to receive downlink transmissions from two or more cells, wherein each downlink transmission includes one or more streams, and further operative to transmit a jointly encoded HARQ-ACK response on a single uplink channel to two or more cells; and
- a controller operative to jointly encode the HARQ-ACK response for the two or more cells by encoding a HARQ-ACK codeword to resolve an ambiguity in a predetermined codebook of HARQ-ACK codewords that includes at least one HARQ-ACK codeword for downlink MIMO transmissions from one or more of the cells, and such that the decoding of the jointly encoded HARQ-ACK codeword at each cell is independent of the number of streams in downlink transmissions from other cells.

9. The UE of claim 8 wherein the predetermined codebook is specified in Table 15C.2 of 3GPP TS 25.212.

10. The UE of claim 8 wherein the transceiver is operative to transmit the jointly encoded HARQ-ACK on HS-DPCCH.

11. The UE of claim 8 wherein the ambiguity arises due to reuse, in the predetermined codebook, of the same codeword to represent two or more different HARQ-ACK joint encodings.

12. The UE of claim 8 wherein at least one of the cells operates in Multiple Input, Multiple Output (MIMO) mode.

13. The UE of claim 12 wherein the ambiguity arises due to one cell having insufficient knowledge of the transmissions of the other cell.

14. The UE of claim 8 wherein the ambiguity arises due to similarity between two or more codewords in the predetermined codebook, and wherein the controller is further operative to
- calculate the Hamming distance between first and second codewords, and
- substitute at least one HARQ-ACK codeword for at least one of the first and second codeword by substituting the codeword only if the Hamming distance is less than a predetermined value.

15. The UE of claim 8 further comprising:
- a machine readable media containing codeword selection program instructions operative to cause the controller to a perform the HARQ-ACK codeword identification and substitution operations.

* * * * *

UNITED STATES PATENT AND TRADEMARK OFFICE
CERTIFICATE OF CORRECTION

| | | |
|---|---|---|
| PATENT NO. | : 9,008,201 B2 | Page 1 of 1 |
| APPLICATION NO. | : 13/702602 | |
| DATED | : April 14, 2015 | |
| INVENTOR(S) | : Hultell et al. | |

It is certified that error appears in the above-identified patent and that said Letters Patent is hereby corrected as shown below:

On the title page

On Page 2, item (56), under "OTHER PUBLICATIONS", in Column 2, Line 3, delete "(Reslease 11)" and insert -- (Release 11) --, therefor.

In the specification

In Column 1, Line 64, delete "ANN" and insert -- AA/N --, therefor.

In Column 2, Line 64, delete "ANN" and insert -- AA/N --, therefor.

In Column 4, Line 3, delete "hardare" and insert -- hardware --, therefor.

In the claims

In Column 4, Line 64, in Claim 7, delete "wherein substituting" and insert -- wherein --, therefor.

In Column 6, Lines 12-13, in Claim 14, delete "operative to" and insert -- operative to: --, therefor.

In Column 6, Lines 21-22, in Claim 15, delete "to a perform" and insert -- to perform --, therefor.

Signed and Sealed this
Sixth Day of October, 2015

Michelle K. Lee
*Director of the United States Patent and Trademark Office*